(12) United States Patent
Baker et al.

(10) Patent No.: US 10,464,014 B2
(45) Date of Patent: Nov. 5, 2019

(54) INTEGRATED GAS SEPARATION-TURBINE CO2 CAPTURE PROCESSES

(71) Applicant: Membrane Technology and Research, Inc., Newark, CA (US)

(72) Inventors: Richard W Baker, Palo Alto, CA (US); Timothy C Merkel, San Jose, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 176 days.

(21) Appl. No.: 15/689,465

(22) Filed: Aug. 29, 2017

(65) Prior Publication Data
US 2018/0133642 A1    May 17, 2018

Related U.S. Application Data

(62) Division of application No. 15/353,310, filed on Nov. 16, 2016, now Pat. No. 9,782,718.

(51) Int. Cl.
*B01D 53/22* (2006.01)
*B01D 53/14* (2006.01)
(Continued)

(52) U.S. Cl.
CPC ....... *B01D 53/1475* (2013.01); *B01D 53/005* (2013.01); *B01D 53/02* (2013.01);
(Continued)

(58) Field of Classification Search
CPC ...... B01D 53/22; B01D 53/005; B01D 53/62; B01D 2257/102; B01D 53/002;
(Continued)

(56) References Cited

U.S. PATENT DOCUMENTS

| 990,168 A | 4/1911 | Scott |
|---|---|---|
| 1,783,901 A | 12/1930 | Bottoms |

(Continued)

FOREIGN PATENT DOCUMENTS

| CN | 102795956 A | 11/2012 |
|---|---|---|
| EP | 2505573 A1 | 10/2012 |
| WO | WO2009139835 A1 | 11/2009 |

OTHER PUBLICATIONS

US 4,981,498 A, 01/1991, Bikson et al. (withdrawn)
(Continued)

*Primary Examiner* — Anthony R Shumate
(74) *Attorney, Agent, or Firm* — Timothy A. Hott; Suk H. Chow

(57) ABSTRACT

Sweep-based gas separation processes for reducing carbon dioxide emissions from gas-fired power plants. The invention involves at least two compression steps, a combustion step, a carbon dioxide capture step, a power generate step, and a sweep-based membrane separation step. One of the compression steps is used to produce a low-pressure, low-temperature compressed stream that is sent for treatment in the carbon dioxide capture step, thereby avoiding the need to expend large amounts of energy to cool an otherwise hot compressed stream from a typical compressor that produces a high-pressure stream, usually at 20-30 bar or more.

13 Claims, 4 Drawing Sheets

(51) Int. Cl.
  *B01D 53/02* (2006.01)
  *B01D 53/00* (2006.01)
  *F02C 3/04* (2006.01)
  *F02C 3/20* (2006.01)
  *H02K 7/18* (2006.01)
  *B01D 53/62* (2006.01)
  *F02C 3/00* (2006.01)
  *F02C 6/00* (2006.01)
  *F02C 6/18* (2006.01)
  *B01D 53/26* (2006.01)

(52) U.S. Cl.
  CPC ............ *B01D 53/22* (2013.01); *B01D 53/229* (2013.01); *B01D 53/62* (2013.01); *F02C 3/00* (2013.01); *F02C 3/04* (2013.01); *F02C 3/20* (2013.01); *F02C 6/00* (2013.01); *F02C 6/18* (2013.01); *H02K 7/1823* (2013.01); *B01D 53/002* (2013.01); *B01D 53/265* (2013.01); *B01D 2251/306* (2013.01); *B01D 2251/606* (2013.01); *B01D 2252/204* (2013.01); *B01D 2256/22* (2013.01); *B01D 2257/102* (2013.01); *B01D 2257/104* (2013.01); *B01D 2257/504* (2013.01); *B01D 2257/80* (2013.01); *B01D 2258/0283* (2013.01); *F05D 2220/76* (2013.01); *F05D 2260/61* (2013.01); *Y02A 50/2342* (2018.01); *Y02C 10/04* (2013.01); *Y02C 10/06* (2013.01); *Y02C 10/08* (2013.01); *Y02C 10/10* (2013.01); *Y02E 20/16* (2013.01); *Y02E 20/18* (2013.01); *Y02E 20/326* (2013.01)

(58) Field of Classification Search
  CPC ............ B01D 53/265; B01D 2257/104; B01D 2256/22; B01D 53/1475; B01D 2257/80; B01D 2251/306; B01D 2257/504; B01D 2252/204; B01D 2251/606; B01D 2258/0283; B01D 53/229; B01D 53/02; Y02A 50/2342; F02C 6/18; F02C 3/04; F02C 6/00; F02C 3/20; F02C 3/00; H02K 7/1823; F05D 2220/76; F05D 2260/61; Y02C 10/08; Y02C 10/10; Y02C 10/04; Y02C 10/06; Y02E 20/16; Y02E 20/18; Y02E 20/326
  See application file for complete search history.

(56) References Cited

U.S. PATENT DOCUMENTS

| | | | |
|---|---|---|---|
| 2,651,176 A | | 9/1953 | Yellott |
| 3,651,640 A | | 3/1972 | Nicita |
| 3,766,027 A | * | 10/1973 | Gregory .................... C07C 1/12 205/349 |
| 3,852,180 A | * | 12/1974 | Gregory .................... C07C 1/12 204/246 |
| 4,350,511 A | | 9/1982 | Holmes et al. |
| 4,371,381 A | | 2/1983 | Schuftan |
| 4,376,102 A | | 3/1983 | Thaler et al. |
| 4,462,814 A | | 7/1984 | Holmes et al. |
| 4,639,257 A | | 1/1987 | Duckett et al. |
| 4,659,343 A | | 4/1987 | Kelly |
| 4,761,164 A | | 8/1988 | Pez et al. |
| 4,781,907 A | | 11/1988 | McNeill |
| 4,834,779 A | | 5/1989 | Paganessi et al. |
| 4,843,206 A | | 6/1989 | Azuma et al. |
| 4,923,493 A | | 5/1990 | Valencia et al. |
| 4,931,070 A | | 5/1990 | Prasad |
| 4,936,887 A | | 6/1990 | Waldo et al. |
| 4,963,165 A | | 10/1990 | Blume et al. |
| 4,990,168 A | | 2/1991 | Sauer et al. |
| 5,034,126 A | | 7/1991 | Reddy et al. |
| 5,233,837 A | | 8/1993 | Callahan |
| 5,240,471 A | | 8/1993 | Barbe et al. |
| 5,256,295 A | | 10/1993 | Baker et al. |
| 5,430,218 A | | 7/1995 | Miller et al. |
| 5,452,581 A | | 9/1995 | Dinh et al. |
| 5,500,036 A | | 3/1996 | Kalthod |
| 5,516,961 A | | 5/1996 | Miller et al. |
| 5,641,337 A | | 6/1997 | Arrowsmith et al. |
| 5,675,052 A | | 10/1997 | Menon et al. |
| 5,681,433 A | | 10/1997 | Friesen et al. |
| 5,724,805 A | | 3/1998 | Golomb et al. |
| 5,769,927 A | | 6/1998 | Gottschlich et al. |
| 5,779,763 A | | 7/1998 | Pinnau et al. |
| 5,843,209 A | | 12/1998 | Ray et al. |
| 5,979,178 A | | 11/1999 | Engler et al. |
| 5,980,609 A | | 11/1999 | Baker et al. |
| 6,085,549 A | | 7/2000 | Daus et al. |
| 6,139,604 A | * | 10/2000 | Gottzmann ........ B01D 53/0462 95/54 |
| 6,228,145 B1 | | 5/2001 | Falk-Pedersen et al. |
| 6,298,664 B1 | * | 10/2001 | Åsen ...................... B01D 53/22 60/649 |
| 6,478,852 B1 | | 11/2002 | Callaghan et al. |
| 6,537,514 B1 | * | 3/2003 | Prasad .................... B01D 53/22 423/437.1 |
| 6,572,837 B1 | | 6/2003 | Holland et al. |
| 6,648,944 B1 | | 11/2003 | Baker et al. |
| 6,695,983 B2 | | 2/2004 | Prasad et al. |
| 6,702,570 B2 | | 3/2004 | Shah et al. |
| 6,723,231 B1 | | 4/2004 | Geus et al. |
| 6,767,527 B1 | * | 7/2004 | Åsen .................... B01D 53/226 423/437.1 |
| 6,821,501 B2 | | 11/2004 | Matzakos et al. |
| 6,951,111 B2 | | 10/2005 | Chen |
| 7,329,306 B1 | | 2/2008 | Koch |
| 7,405,338 B2 | | 7/2008 | Brophy et al. |
| 7,625,427 B2 | | 12/2009 | Clarke et al. |
| 7,713,332 B2 | | 5/2010 | Bronold |
| 7,763,097 B2 | | 7/2010 | Federspiel et al. |
| 7,909,911 B2 | | 3/2011 | Kackner et al. |
| 7,964,020 B2 | | 6/2011 | Baker et al. |
| 7,966,829 B2 | | 6/2011 | Finkenrath et al. |
| 7,981,196 B2 | | 7/2011 | Kang et al. |
| 8,016,923 B2 | | 9/2011 | Baker et al. |
| 8,025,715 B2 | | 9/2011 | Wijmans et al. |
| 8,034,168 B2 | | 10/2011 | Wijmans et al. |
| 8,104,259 B2 | | 1/2012 | Joshi et al. |
| 8,163,065 B2 | | 4/2012 | Lackner et al. |
| 8,177,885 B2 | | 5/2012 | Wijmans et al. |
| 8,220,247 B2 | | 7/2012 | Wijmans et al. |
| 8,220,248 B2 | | 7/2012 | Wijmans et al. |
| 8,246,718 B2 | | 8/2012 | Wijmans et al. |
| 8,669,294 B2 | | 3/2014 | Lien et al. |
| 8,734,569 B2 | | 5/2014 | Hasse et al. |
| 8,829,059 B2 | | 9/2014 | Wynn |
| 8,852,319 B2 | | 10/2014 | Wijmans et al. |
| 8,869,890 B2 | | 10/2014 | Chinn et al. |
| 9,140,186 B2 | | 9/2015 | Wei et al. |
| 9,146,035 B2 | | 9/2015 | Boulet |
| 2003/0068260 A1 | | 4/2003 | Wellington et al. |
| 2003/0131582 A1 | | 7/2003 | Anderson et al. |
| 2004/0002030 A1 | * | 1/2004 | Shah ...................... F23L 7/007 431/12 |
| 2005/0011353 A1 | | 1/2005 | Shirley |
| 2005/0028529 A1 | | 2/2005 | Bartlett et al. |
| 2005/0053878 A1 | | 3/2005 | Bruun et al. |
| 2005/0238563 A1 | | 10/2005 | Eighmy et al. |
| 2006/0019138 A1 | * | 1/2006 | Jansen .............. H01M 8/04156 48/197 R |
| 2006/0102493 A1 | * | 5/2006 | Grouset ................ B01J 8/0492 205/628 |
| 2007/0248527 A1 | | 10/2007 | Spencer |
| 2008/0011161 A1 | | 1/2008 | Finkenrath et al. |
| 2008/0127632 A1 | | 6/2008 | Finkenrath et al. |
| 2008/0176174 A1 | | 7/2008 | White et al. |
| 2008/0309087 A1 | | 12/2008 | Evulet et al. |
| 2009/0162922 A1 | | 6/2009 | De Mattia et al. |
| 2009/0232861 A1 | | 9/2009 | Wright et al. |
| 2009/0257941 A1 | | 10/2009 | Rudberg et al. |

(56) References Cited

U.S. PATENT DOCUMENTS

| | | |
|---|---|---|
| 2010/0037772 A1 | 2/2010 | Roe et al. |
| 2010/0126180 A1 | 5/2010 | Forsyth et al. |
| 2010/0180565 A1 | 7/2010 | Draper |
| 2010/0205960 A1 | 8/2010 | McBride et al. |
| 2010/0236404 A1 | 9/2010 | Baker et al. |
| 2010/0251887 A1 | 10/2010 | Jain |
| 2010/0260657 A1 | 10/2010 | Niitsuma et al. |
| 2010/0300114 A1 | 12/2010 | Mhadeshwar et al. |
| 2011/0005272 A1 | 1/2011 | Wijmans et al. |
| 2011/0167821 A1 | 7/2011 | Baker et al. |
| 2011/0195473 A1 | 8/2011 | Wilhelm |
| 2011/0200491 A1 | 8/2011 | Wijmans et al. |
| 2011/0219777 A1 | 9/2011 | Wijmans et al. |
| 2011/0219778 A1 | 9/2011 | Wijmans et al. |
| 2011/0219949 A1 | 9/2011 | Wijmans et al. |
| 2011/0239700 A1 | 10/2011 | Hasse et al. |
| 2011/0260112 A1 | 10/2011 | Wijmans et al. |
| 2011/0262328 A1 | 10/2011 | Wijmans et al. |
| 2012/0031101 A1 | 2/2012 | Hoffmann et al. |
| 2012/0042810 A1 | 2/2012 | Niass |
| 2012/0055385 A1 | 3/2012 | Lien et al. |
| 2012/0078024 A1 | 3/2012 | Butler et al. |
| 2012/0118011 A1 | 5/2012 | Terrien et al. |
| 2012/0131925 A1 | 5/2012 | Mittricker et al. |
| 2012/0190904 A1 | 7/2012 | Butler |
| 2012/0272657 A1 | 11/2012 | Baker et al. |
| 2013/0058853 A1 | 3/2013 | Baker et al. |
| 2013/0086917 A1 | 4/2013 | Slobodyanskiy et al. |
| 2013/0104525 A1 | 5/2013 | Allam et al. |
| 2013/0125554 A1 | 5/2013 | Mittricker et al. |
| 2013/0131199 A1 | 5/2013 | Lien et al. |
| 2013/0200625 A1 | 8/2013 | Wei et al. |
| 2013/0213049 A1 | 8/2013 | Allam et al. |
| 2013/0244190 A1 | 9/2013 | Marumoto et al. |
| 2013/0283808 A1 | 10/2013 | Kolvick |
| 2014/0366549 A1 | 12/2014 | Wang et al. |
| 2014/0366724 A1 | 12/2014 | Wijmans et al. |
| 2014/0374109 A1 | 12/2014 | Denton et al. |
| 2015/0013300 A1 | 1/2015 | Axelbaum et al. |
| 2015/0267611 A1* | 9/2015 | Nemitallah ............... F02C 3/20 60/776 |
| 2015/0362188 A1 | 12/2015 | Wojak |
| 2016/0102859 A1 | 4/2016 | Fisher |
| 2016/0256819 A1 | 9/2016 | Kulkarni |
| 2018/0038277 A1* | 2/2018 | Habib ................. H02K 7/1823 |

OTHER PUBLICATIONS

A. Kohl and R. Nielsen, Gas Purification, fifth edition, Gulf Publishing Co, Houston TX, 1997, pp. 1188-1237.

K. O'Brien et al. "Fabrication and Scale-Up of PBI-based Membrane System for Pre-Combustion Capture of Carbon Dioxide," DOE NETL Project Fact Sheet, 2009.

B. T. Low et al., "Simultaneous Occurrence of Chemical Grafting, Cross-linking, and Etching on the Surface of Polyimide Membranes and Their Impact on H2/CO2 Separation," Macromolecules, vol. 41, No. 4, pp. 1297-1309, 2008.

Lin et al., "Materials selection guidelines for membranes that remove CO2 from gas mixtures," J. Mol. Struct., 739, 57-75, 2005.

Lin et al., "Plastization-Enhanced Hydrogen Purification Using Polymeric Membranes," Science, 311, 639-642, 2006.

M. Anderson and Y.S. Lin, "Carbonate-ceramic dual-phase membrane for carbon dioxide separation", Journal of Membrane Science, vol. 357(1-2), pp. 122-129 (2010).

J. Lou and W.S. Ho, "CO2-selective polymeric membranes containing amines in crosslinked poly(vinyl alcohol)", Journal of Membrane Science, vol. 286, pp. 310-321 (2006).

\* cited by examiner (not in accordance with the invention)

INTEGRATED GAS SEPARATION-TURBINE CO2 CAPTURE PROCESSES

CROSS-REFERENCE TO RELATED APPLICATIONS

This application is a divisional of U.S. application Ser. No. 15/353,310, filed on Nov. 16, 2016, the disclosure of which is hereby incorporated herein by reference in its entirety.

FIELD OF THE INVENTION

The invention relates to membrane-based gas separation processes, and specifically to sweep-based membrane separation processes to remove carbon dioxide from combustion gases. More particularly, the invention uses a low-pressure, low-temperature $CO_2$ capture step integrated into gas-fired power plants.

BACKGROUND OF THE INVENTION

Presented below is background information on certain aspects of the present invention as they may relate to technical features referred to in the detailed description, but not necessarily described in detail. The discussion below should not be construed as an admission as to the relevance of the information to the claimed invention or the prior art effect of the material described.

Much of the world's electricity is generated by coal power plants. These plants vent ~800 g of $CO_2$ to the atmosphere for every kilowatt of electricity produced. These emissions are a major contributor to global warming. Natural gas is increasingly being used to replace coal, particularly in the United States, where the development of directional drilling and hydraulic fracturing has produced a large supply of low-cost gas. Natural gas power plants vent ~400 g of $CO_2$ to the atmosphere for every kilowatt of electricity produced, so switching fuels from coal to natural gas cuts $CO_2$ emissions in half. However, longer-term, the emissions of natural gas power plants will also need to be controlled if global warming targets are to be met.

A variety of technologies are being developed to separate $CO_2$ from power plant flue gas so the $CO_2$ can be sequestered. Amine absorption is the leading technology but is costly, produces its own atmospheric emissions, requires careful operation and maintenance, and has a very large footprint. Membrane technology is also being developed and has many benefits, including lower capital and operating costs, modular construction, small footprint, no emissions and no changes to the power plant steam cycle are required. However, the technology is not as developed as amine, although demonstration units processing up to 20 tons $CO_2$/day have been built.

In U.S. Pat. No. 7,962,020, we disclosed a membrane process to capture $CO_2$ from coal power plant flue gas. These processes use combustion air as a sweep stream in a membrane contactor. The air sweep strips $CO_2$ from the flue gas and recycles it back to the boiler. By selectivity recycling $CO_2$, the concentration of $CO_2$ in the flue gas is increased, making its separation much easier. These processes were subsequently applied to gas turbine power plants, such as in U.S. Pat. No. 8,220,247.

Natural gas turbine power plants are costly, large, and highly optimized machines. The expectation is that only minor modifications to the turbines will be needed so these $CO_2$ separation systems can be retrofitted to existing turbines. However, for new plants, the best hope for major reductions in $CO_2$ capture cost is to integrate the capture processes into the turbine design.

One such integrated process was disclosed in our U.S. Pat. No. 9,140,186, shown here in FIG. 4. An air intake stream, 406, is directed to a first compressor, 401a. A compressed gas stream, 443, is combusted with an incoming fuel gas stream, 416 in combustor, 402. The hot, high-pressure gas from the combustor, stream 417, is then expanded through the gas turbine, 403. The gas turbine is mechanically linked to the first and second compressors, 401a and 401b, respectively, and an electricity generator, 404, by shaft 405. The low-pressure exhaust gas, stream 419, from the gas turbine is still hot and sent to a heat recovery steam generator, 420. This section includes a boiler that produces steam, 421, which can be directed to a steam turbine (not shown). A first portion of the gas exiting the steam generator, stream 425, is routed as feed gas to sweep-based membrane separation step, 426.

Step 426 is carried out using membranes that are selective in favor of carbon dioxide over oxygen and nitrogen. Feed stream 425 flows across the feed side of the membranes, and a sweep gas stream, 428, comprising air, oxygen-enriched air or oxygen flows across the permeate side. The membrane separation step divides stream 425 into residue stream 429, depleted in carbon dioxide as compared to feed stream 425, and permeate stream/sweep stream 430. The residue stream forms the treated flue gas produced by the process. The permeate/sweep stream, 430, containing at least 10 vol % carbon dioxide, is withdrawn from the membrane unit and is passed to compressor 101a to form at least part of the air intake stream, 406, to first compression step 101a.

A second portion of the turbine exhaust, stream 445, is directed to second compressor 401b. The second compressed stream, 444, is then directed to a gas-membrane separation step, 412. Step 412 uses molten salt membranes, 446, which are selective to carbon dioxide over oxygen and nitrogen, to separate the second compressed stream, 444, into a carbon dioxide-enriched permeate stream, 413, and a carbon dioxide-depleted residue stream, 414. Step 412 removes anywhere between at least 50% to 80%, or even 90% of the generated carbon dioxide from the combustor. High levels of carbon dioxide removal by step 412 are not required because residue stream 414 is not vented to the atmosphere, but sent back to the turbine, 403.

One disadvantage of this design, however, is that the compressed air being feed into the gas separation unit is extremely hot, at about 500° C. As a practical matter, this limits the $CO_2$ permeable membranes, 446, to very expensive inorganic materials, such as ceramics or zeolites, which can withstand high temperatures. If more readily available and lower cost polymer membranes are to be used, massive amounts of cooling of the feed gas to bring the gas to the 30-100° C. range is required.

Therefore, it would be beneficial if an integrated gas separation-turbine process were developed that was more economical for $CO_2$ separation.

SUMMARY OF THE INVENTION

The invention is a process involving a sweep-based membrane gas separation step for reducing carbon dioxide emissions from gas-fired power plants. The sweep-based membrane gas separation step removes carbon dioxide from the turbine exhaust gas and returns it with the incoming sweep stream to a first compression step. The process also includes a second compression step, a combustion step, and an expansion/electricity generation step.

The process further includes a carbon dioxide capture step integrated between the first and second compression steps. The carbon capture step involves treating a compressed gas stream from the first compression step to produce a carbon dioxide-enriched stream, which is withdrawn from the process, and a carbon dioxide-depleted stream, which is routed for further compression in a second compression step prior to the combustion step.

By integrating the carbon dioxide capture step into the turbine compression process, considerable energy and cost savings can result. The carbon dioxide capture process could be performed on the compressed gas stream at 30 bar, as in conventional processes, but this gas is extremely hot, typically about 500 to 800° C. Cooling this gas to a temperature low enough for a conventional membrane or absorption or adsorption process that could treat this hot gas would be expensive and would lose a significant fraction of the heat required to drive the turbo expander. By positioning the carbon capture unit at an intermediate compression stage, in the range of about 2 to 10 bar, the amount of cooling required is greatly reduced. The Benfield potassium carbonate process can operate at a temperature of 100 to 120° C. Some polymeric membranes can also operate at these temperatures. This means only limited cooling would be required, thus considerably simplifying the process.

Accordingly, a basic embodiment of the present invention is a process for controlling carbon dioxide exhaust from a combustion process, comprising:
(a) compressing an oxygen-containing stream in a first compression apparatus, thereby producing a first compressed gas stream;
(b) routing at least a portion of the first compressed gas stream to a gas separation apparatus adapted to selectively remove carbon dioxide, thereby producing a carbon dioxide-enriched stream and a carbon dioxide-depleted stream;
(c) compressing the carbon dioxide-depleted stream in a second compression apparatus, thereby producing a second compressed gas stream;
(d) combusting at least a portion of the second compressed gas stream with a gaseous fuel in a combustion apparatus, thereby producing a combusted gas stream;
(e) routing the combusted gas stream as part of a working gas stream to a gas turbine apparatus mechanically coupled to an electricity generator, and operating the gas turbine apparatus, thereby generating electric power and producing a turbine exhaust stream;
(f) passing at least a portion of the turbine exhaust stream to a membrane separation step, wherein the membrane separation step comprises:
  (i) providing a membrane having a feed side and a permeate side, and being selectively permeable to carbon dioxide over nitrogen and to carbon dioxide over oxygen,
  (ii) passing the first portion of the turbine exhaust stream across the feed side,
  (iii) passing air, oxygen-enriched air, or oxygen as a sweep stream across the permeate side,
  (iv) withdrawing from the feed side a residue stream that is depleted in carbon dioxide compared to the turbine exhaust stream, and
  (v) withdrawing from the permeate side a permeate stream comprising oxygen and carbon dioxide; and
(g) passing the permeate stream to step (a) as at least a portion of the oxygen-containing gas.

The compression steps may be performed using separate, discrete compressors or using a single compression train or apparatus, which has been modified to allow a portion of the compressed gas to be removed from the compression apparatus at an intermediate stage in the train. Gas can also be introduced to the compression train at an appropriate compression stage. The compressors are usually coupled to a gas turbine or turbines, typically on the same shaft.

After compression in step (a), the gas that is to be routed to the gas separation apparatus will generally be at a pressure of about 2-10 bar, more preferably about 2-5 bar, and at a temperature of less than about 200° C. Depending on the preferred operating conditions for the gas separation apparatus, it may be desirable to cool the first compressed gas stream, such as by heat exchange against other process streams, before it passes as feed to the carbon dioxide removal/capture step.

The carbon dioxide removal/capture step of step (b) preferably comprises at least one process selected from the group consisting of absorption, adsorption, liquefaction, and membrane separation, or a combination of these. Most preferably, the carbon dioxide removal step is a membrane separation step. In this case, a gas separation apparatus/unit is used that incorporates membrane units containing membranes selectively permeable to carbon dioxide over nitrogen and oxygen. Various types of membranes may be used, but it is preferred that the membrane is a polymeric membrane.

Only a portion of the carbon dioxide in the carbon dioxide-containing gas stream needs to be removed by the carbon dioxide removal process. Some processes, for example, absorption processes, are generally most efficient when they remove 90% or more of the carbon dioxide in the gas stream. In this case, only a portion of the feed gas would need to be sent to the separation unit and the remainder would bypass the separation unit. Other processes, such as membrane processes, are most efficient when only 50% or 60% of the carbon dioxide in the feed gas is removed by the membrane. In this case, the portion of the feed gas sent to the separation unit would be larger and only a small portion, or none, of the gas would bypass the separation unit.

In the case that absorption is used, the gas separation apparatus will typically incorporate a scrubbing column for contacting the gas with a sorbent and a stripping column for regenerating the sorbent and releasing a high-concentration carbon dioxide stream. Preferred sorption processes include the Benfield process, using potassium carbonate as sorbent, and amine-based processes.

Step (b) captures carbon dioxide, which is removed from the process in the form of a concentrated stream, typically containing greater than 60 vol %, 70 vol %, 80 vol %, or more carbon dioxide. This stream may be sent for liquefaction, sequestration, or any other use.

In step (c), the carbon dioxide-depleted stream from carbon dioxide removal step is compressed in a second compressor to a pressure of about 30 bar and a temperature of about 500° C. or more.

Step (d) may be carried out using any combustible gas, such as natural gas, hydrogen or syngas, or even vaporized hydrocarbon liquid, as fuel.

Step (e) is the power generation step where a gas turbine is mechanically linked to the compressors and to an electrical power generator. The combusted gas from the combustor is routed as part of a working gas stream to the gas turbine to produce a low pressure, hot turbine exhaust gas. Optionally, in certain aspects, a portion of the second compressed stream may bypass the combustion step and be sent as a diluent stream as part of the working gas stream to the turbine.

In step (f), at least a portion of the turbine exhaust gas is passed across the feed side of a membrane separation unit that contains membranes selectively permeable to carbon dioxide over nitrogen and to carbon dioxide over oxygen.

The exhaust stream flows across the feed side of the membranes, and a sweep gas of air, oxygen-enriched air, or oxygen flows across the permeate side, to provide or augment the driving force for transmembrane permeation. The sweep stream picks up the preferentially permeating carbon dioxide. The combined sweep/permeate stream is withdrawn from the membrane unit and directed to the combustor to form at least part of the air, oxygen-enriched air, or oxygen feed to the combustion step.

Absent the sweep-based membrane separation step, the incoming fresh air to the compressor and combustor would contain the normal atmospheric content of carbon dioxide (300-400 ppm). The membrane permeate/sweep stream is enriched in carbon dioxide by 2-3 orders of magnitude compared with atmospheric air, and will preferably contain at least about 10 vol % carbon dioxide, more preferably at least about 15 vol % carbon dioxide or even higher, such as 20 vol % or above.

It is the great enrichment of carbon dioxide in the incoming air or oxygen stream brought about by step (f) that enables this composition-adjusted air stream to be tapped as the source stream for carbon dioxide removal and capture for the overall process.

The residue stream withdrawn per step (f)(iv) forms the treated flue gas produced by the process, and is usually discharged to the environment via the power plant stack. The carbon dioxide content is preferably less than about 5 vol %; more preferably less than about 2 vol %, and most preferably no greater than about 1 vol %. The reduction of the carbon dioxide content to 20%, 10%, or less of the conventional content of flue gas from a gas-fired power plant greatly reduces the environmental impact of the plant.

The process of the invention can be carried out in all types of gas-fired power plants. In combined cycle plants, the gas turbine exhaust gas stream can be directed through a heat recovery steam generator (HRSG) operation between steps (e) and (f), so that the feed gas to the sweep-based membrane separation step is the exhaust gas from the steam generator.

If it is necessary to cool the turbine exhaust gas before passing it to the sweep-based membrane step, this may be done by heat exchange or otherwise in an optional cooling step. Any condensed water may be removed from the process.

Either all or a portion of the turbine exhaust gas is then sent as feed to the sweep-based membrane separation step, and the resulting permeate/sweep stream is returned to the first compressor in step (a). As with the embodiments described in our earlier '247 patent, a portion of the turbine exhaust stream may optionally be diverted and returned to the compression train without passing through the sweep-based membrane separation step.

In the embodiments discussed above, the carbon dioxide capture step and the combustion step are performed in series. That is, the carbon dioxide capture step occurs before the combustion step. However, it may be desirable to perform the carbon capture step and the combustion step simultaneously, in parallel. In this way, an oxygen-rich gas, typically containing at least 15% oxygen is sent to the combustor unit, while a second carbon dioxide-rich gas is sent first to the carbon dioxide capture/removal unit and then becomes diluent gas for the turbine expander. Since the carbon dioxide-rich gas is not sent to the combustor, its oxygen content is not important. This allows the two gas streams to be taken from separate places in the process to maximize the oxygen content in one and separately maximize the carbon dioxide content in the other. Thus, as an alternative embodiment, the invention may include the following steps:

(a) compressing an oxygen-containing stream in a first compression step, thereby producing a first compressed gas stream;

(b) compressing a carbon dioxide-containing stream in a second compression step, thereby producing a second compressed gas stream;

(c) combusting the first compressed gas stream with a gaseous fuel in a combustion apparatus, thereby producing a combusted gas stream;

(d) routing at least a portion of the second compressed gas stream to a gas separation apparatus adapted to selectively remove carbon dioxide, thereby producing a carbon dioxide-enriched stream and a carbon dioxide-depleted stream;

(e) compressing the carbon dioxide-depleted stream in a third compression step, thereby producing a third compressed gas stream;

(f) routing the combusted gas stream and the third compressed gas stream as part of a working gas stream to a gas turbine apparatus mechanically coupled to an electricity generator, and operating the gas turbine apparatus, thereby generating electric power and producing a turbine exhaust stream;

(g) passing a first portion of the turbine exhaust stream back to the second compressor as at least a portion of the carbon dioxide-containing stream;

(h) passing at least a second portion of the turbine exhaust stream to a membrane separation step, wherein the membrane separation step comprises:
  (i) providing a membrane having a feed side and a permeate side, and being selectively permeable to carbon dioxide over nitrogen and to carbon dioxide over oxygen,
  (ii) passing the third portion of the turbine exhaust stream across the feed side,
  (iii) passing air, oxygen-enriched air, or oxygen as a sweep stream across the permeate side,
  (iv) withdrawing from the feed side a residue stream that is depleted in carbon dioxide compared to the turbine exhaust stream, and
  (v) withdrawing from the permeate side a permeate stream comprising oxygen and carbon dioxide; and (i) passing the permeate stream to step (a) as at least a portion of the oxygen-containing gas.

This embodiment involves three compression steps. In the first compression step, a permeate/sweep stream from the sweep-based membrane separation step is compressed as a first air intake stream to produce a first compressed gas stream. The first air intake stream is compressed to a pressure of about 30 bar and a temperature of about 500° C. or more. The first compressed stream is then sent to the combustor along with a fuel gas stream.

In the second compression step, a portion of the turbine exhaust stream bypasses the sweep-based membrane separation step and is compressed to produce a second compressed gas stream. The second compressed gas stream is compressed to a pressure of about 2-10 bar, more preferably about 2-5 bar. This stream will have a temperature of less than about 200° C. The second compressed gas stream is then routed to the carbon capture step for treatment in a gas separation apparatus.

In the third compression step, the off-gas from the carbon capture step is compressed to produce a third compressed gas stream. This stream is compressed to a pressure of about 30 bar and, like the first compression step, has temperature of about 500° C. or more. The third compressed stream is then directed as part of the working gas stream along with the combusted gas from the combustion step to a gas turbine.

DETAILED DESCRIPTION OF THE INVENTION

The term "gas" as used herein means a gas or a vapor.

The terms "exhaust gas", "flue gas" and "emissions stream" are used interchangeably herein.

The terms "mol %" and "vol %" are used interchangeably herein.

The invention is a process involving membrane-based gas separation and power generation, specifically for controlling carbon dioxide emissions from gas-fired power plants, including traditional plants, combined cycle plants incorporating HRSG, and IGCC plants. The process includes multiple compression steps, a combustion step, and an expansion/electricity generation step, as in traditional power plants. The process also includes a sweep-driven membrane separation step and a carbon dioxide removal or capture step. Besides generating electric power, the process yields two gas streams: a vent or flue gas stream of low carbon dioxide concentration that can be sent to the power plant stack, and a carbon dioxide product stream of high concentration that can be sent for purification and/or sequestration.

Figure 1:
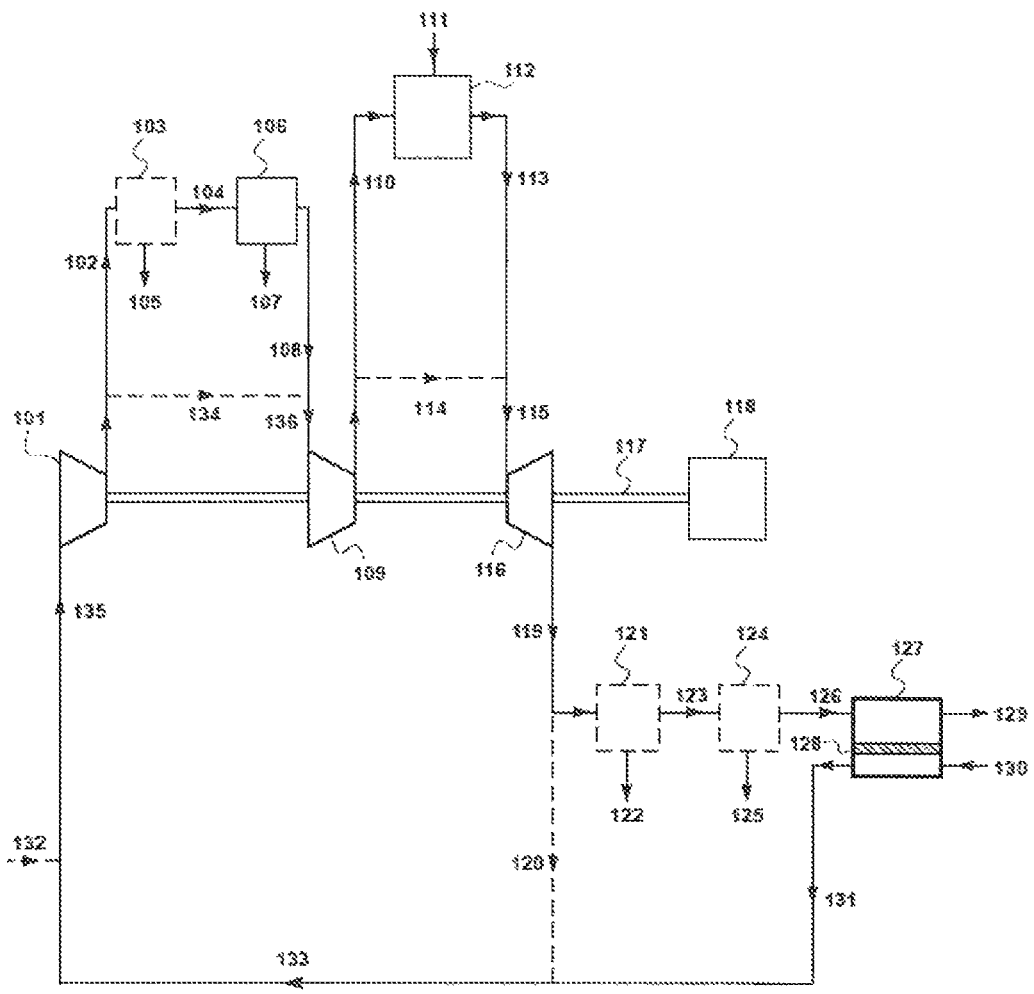
FIG. 1 is a schematic drawing of a flow scheme showing a basic embodiment of the invention having two compression steps with a gas separation unit integrated between the steps.

A simple flow scheme for a basic embodiment of a gas separation and power generation process in accordance with the invention is shown in FIG. 1. It will be appreciated by those of skill in the art that FIG. 1 and the other figures showing process schemes herein are very simple block diagrams, intended to make clear the key unit operations of the processes of the invention, and that actual process trains may include additional steps of a standard type, such as heating, chilling, compressing, condensing, pumping, monitoring of pressures, temperatures, flows, and the like. It will also be appreciated by those of skill in the art that the unit operations may themselves be performed as multiple steps or in a train of multiple pieces of equipment.

Turning back to FIG. 1, air, oxygen-enriched air, or oxygen is introduced into the processes as stream 130 and flows as a sweep stream across the permeate side of the sweep-driven membrane separation unit, 127, discussed in more detail below. The permeate stream, 131, comprises both the sweep gas and carbon dioxide that has permeated the membranes, 128, and preferably has a carbon dioxide content of at least about 10 vol %, more preferably at least about 15 vol %, and most preferably at least about 20 vol %. Stream 131 passes, with optional addition of a portion of turbine exhaust stream 120 and/or make-up air stream 132, as air intake stream 135, to compression step, 101.

The first compression step is carried out in one or multiple compression units, and produces compressed stream, 102, at a modest pressure in the region of about 2 to 10 bar.

Typically, stream 102 is hot, at a temperature of about 150-200° C. Depending on the operating temperature of the separation equipment, stream 102 may be cooled by heat exchange, recuperation, or otherwise in optional cooling step, 103, to produce cooled stream 104. Stream 104 is preferably cooled to a temperature of about 30-100° C. Water condensed as a result of the cooling may be removed as stream 105.

Compressed stream 102 (or cooled stream 104) is directed to a gas separation step, 106, where carbon dioxide is captured and removed from the process via stream 107.

Various considerations affect the choice of technology and operating methodology for step 106. In steady state, the mass of carbon dioxide removed from the process in streams 107 and 129 equals the mass of carbon dioxide generated by combustion. Preferably, at least 50%, and more preferably at least 80% or 90% of the generated carbon dioxide should be captured into stream 107.

Nevertheless, very high levels of removal of carbon dioxide from the feed inlet gas streams 102 or 104 by gas separation are not required, because the off-gas, stream 108, is not vented to the atmosphere, but is eventually directed to sweep-based membrane separation step 127. The sweep-based membrane separation step recycles carbon dioxide in stream 131, so that the carbon dioxide concentration in stream 102/104 tends to be relatively high, such as 15 vol %, 20 vol % or more. Only a portion of this recirculating carbon dioxide needs to be removed into stream 107 to achieve the target high levels of carbon dioxide capture. This is a significant advantage of the process, as step 106 can then be operated using relatively low-cost, low-energy options.

Step 106 can be carried out by means of any technology or combination of technologies that can create a concentrated carbon dioxide stream from stream 102 or 104. Representative methods that may be used include, but are not limited to, physical or chemical sorption, membrane separation, compression/low temperature condensation, and adsorption. All of these are well known in the art as they relate to carbon dioxide removal from gas mixtures of various types. However, based on the considerations discussed above, the preferred technologies are absorption and membrane separation.

Step 106 produces a concentrated carbon dioxide stream, 107, which is withdrawn from the process. In addition to meeting the specified preferred capture targets, this stream has a relatively high carbon dioxide concentration, and preferably contains greater than about 60 or 70 vol % carbon dioxide. Most preferably, this stream contains at least about 80 vol % carbon dioxide. Thus, unusually, the process achieves in one stream both high levels of carbon dioxide capture and high carbon dioxide concentration.

After withdrawal from the process, stream 107 may pass to any desired destination. The high concentration facilitates liquefaction, transport, pipelining, injection and other forms of sequestration.

The off-gas stream, 108, from the carbon dioxide removal or capture step still contains carbon dioxide, but at a lower concentration than the compressed gas stream, 102/104. Typically, but not necessarily, this concentration is at least about 5 vol %, and can be up to about 10 vol % or even more.

Stream 108 (or stream 136) is sent to a second compression step, 109. The second compression step is carried out in one or multiple compressors, and produces second compressed stream, 109, at a pressure of about 20 bar, 30 bar, or even higher. Although the first and second compression steps in FIG. 1 are shown using two separate compressors, the compression steps may be carried out using a single compression train or apparatus, which has been modified to allow a portion of the compressed gas to be introduced or removed from the compression apparatus at an intermediate stage in the train/apparatus.

Optionally, it may be preferred that a portion of first compressed stream, 134, bypasses cooling step 103 and gas separation step 106, and is mixed with membrane residue stream 108 to form air intake stream 136 before entering second compression step 109. In a membrane gas separation process where carbon dioxide removal is only 40-70% of the carbon dioxide in the gas, the bypass is closed. In an amine process where carbon dioxide removal is about 90%, then the bypass is partially open and only a bit of the first compressed stream goes to the separation unit.

Second compressed stream 110 is introduced with fuel stream 111 into combustion step or zone 112. Natural gas, other methane-containing gas, syngas, hydrogen, or any other fuel capable of burning in air may be used. Combustion produces a hot, high-pressure gas, stream 113.

In a traditional gas-fired combustion process, the exhaust gas from the combustor typically contains about 4 or 5 vol % carbon dioxide. In our process, carbon dioxide is recycled via streams 131/133/135, as discussed in more detail below. As a result, the concentration of carbon dioxide in stream 113 is higher than in a traditional natural gas-fired plant, and is frequently as high as at least about 10 vol %, or even at least 15 vol %, 20 vol % or more.

Stream 113 is then sent as a working gas stream, 115, to gas turbine section, 116. Optionally, a portion of the second compressed stream, 114, may be mixed with stream 113 to form the working gas stream, 115, before being sent to the gas turbine section, 116. This section contains one or more commonly multiple gas turbines, which are coupled by means of a shaft, 117, to compressor(s) 101 and 109, and to electricity generator, 118. The working gas drives the gas turbines, which in turn drive the generator and produce electric power.

The low-pressure exhaust gas from the turbines, stream 119, is still hot, and is optionally and preferably directed to a heat recovery steam generator, 121. This section includes a boiler that produces steam, 122, which can be directed to a steam turbine (not shown). Gas exiting the steam generator, stream 123, is routed as feed gas to sweep-based membrane separation step, 127. If it is necessary to cool the turbine exhaust gas before passing it to the membrane unit, this may be done by heat exchange or otherwise in a cooling step, 124. Any condensed water may be removed as stream 125. After passing through optional HRSG, 121, an optional cooling step, or both, the turbine exhaust stream now passes as feed stream, 126, to sweep-based membrane separation step 127.

Step 127 is carried out using membranes that are selective in favor of carbon dioxide over oxygen and nitrogen. It is preferred that the membranes provide a carbon dioxide/nitrogen selectivity of at least about 10, and most preferably at least about 20 under the operating conditions of the process. A carbon dioxide/oxygen selectivity of at least 10 or 20 is also preferred. A carbon dioxide permeance of at least about 300 gpu, more preferably at least about 500 gpu and most preferably at least about 1,000 gpu is desirable. The permeance does not affect the separation performance, but the higher the permeance, the less membrane area will be required to perform the same separation.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50 or above. A representative preferred material for the selective layer is Pebax®, a polyamide-polyether block copolymer material described in detail in U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. We prefer to use flat-sheet membranes in spiral-wound modules.

Step 127 may be carried out in a single bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Stream 126 flows across the feed side of the membranes, and sweep gas stream, 130, of air, oxygen-enriched air or oxygen flows across the permeate side. The gas flow pattern within the membrane modules should preferably, although not necessarily, be such that flow on the permeate side is at least partly or substantially countercurrent to flow on the feed side.

In membrane gas separation processes, the driving force for transmembrane permeation is supplied by lowering the partial pressure of the desired permeant on the permeate side to a level below its partial pressure on the feed side. The use of the sweep gas stream 130 maintains a low carbon dioxide partial pressure on the permeate side, thereby providing driving force.

The partial pressure of carbon dioxide on the permeate side may be controlled by adjusting the flow rate of the sweep stream. High sweep flow rates will achieve maximum carbon dioxide removal from the membrane feed gas, but a comparatively carbon dioxide dilute permeate stream (that is, comparatively low carbon dioxide enrichment in the sweep gas exiting the modules). Low sweep flow rates will achieve high concentrations of carbon dioxide in the permeate, but relatively low levels of carbon dioxide removal from the feed.

Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. If the pressures are about the same, the entire driving force is provided by the sweep mode operation. Optionally, stream 126 may be supplied to the membrane unit at slightly elevated pressure, by which we mean at a pressure of a few bar, such as 2 bar, 3 bar or 5 bar. If this requires recompression of stream 126, a portion of the energy used for the compressors may be recovered by expanding the residue stream, 129, in a turbine.

The membrane separation step divides stream 126 into residue stream 129, which is depleted in carbon dioxide, and permeate/sweep stream 131. The residue stream forms the treated flue gas produced by the process, and is usually discharged to the environment via the power plant stack. The carbon dioxide content of this stream is preferably less than about 5 vol %; more preferably less than about 2 vol %, and most preferably no greater than about 1 vol %.

The permeate/sweep stream, 131, preferably containing at least 10 vol % carbon dioxide, and more preferably at least about 15 vol % carbon dioxide, is withdrawn from the membrane unit and is passed to the first compression unit, 101, to form at least part of the air, oxygen-enriched air or oxygen feed.

Optionally, turbine exhaust stream 119 may be split into a second portion, and the second portion, indicated by dashed line 120, may bypass the sweep-based membrane separation and be sent with stream 131 as stream 133 to the first compression unit, 101, as at least part of the air, oxygen-enriched air or oxygen feed.

Figure 2:
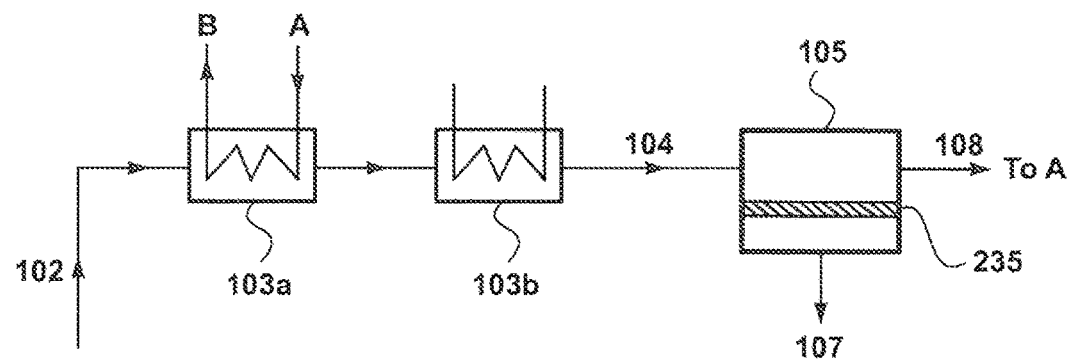
FIG. 2 is an expanded view of the gas separation section of the invention, in which a carbon dioxide-selective membrane separation unit is used.
Figure 2:
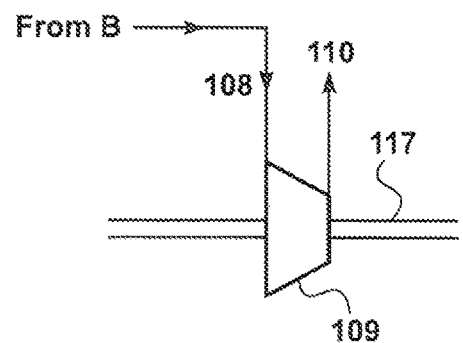

FIG. 2 shows a representative example using membrane separation for the carbon dioxide removal step, 105, with heat integration used to cool in the incoming feed stream. Like elements are numbered as in FIG. 1.

Referring to FIG. 2, first compressed stream 102 is passed through cooling step 103, as shown in FIG. 1, in this case carried out in two heat exchange steps, 103a and 103b. In step 103a, stream 102 is run against membrane residue stream 108, with stream 108 entering the heat exchanger as indicated as position A and exiting at position B. Heated stream 108 is then directed to second compression step 109 as described above for FIG. 1.

In step 103b, additional cooling of stream 102 is provided before it passes as cooled stream 104 to the membrane step, 105, containing membranes, 235.

Figure 3:
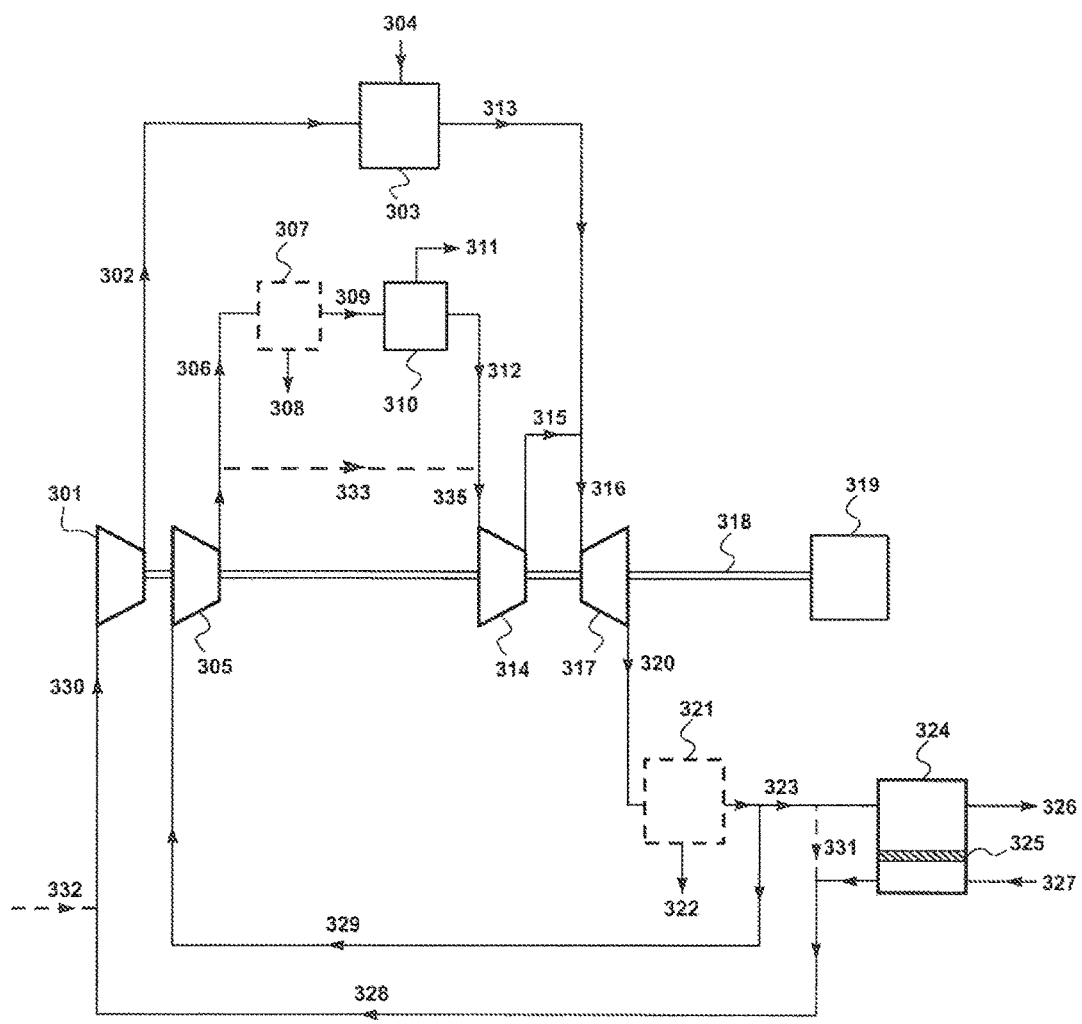
FIG. 3 is a schematic drawing of a flow scheme showing an embodiment of the invention having three compression steps.

An alternative embodiment of the invention is shown in FIG. 3. Air, oxygen-enriched air, or oxygen is introduced into the processes as stream 327 and flows as a sweep stream across the permeate side of the sweep-driven membrane separation unit, 324, discussed in more detail below. The permeate stream, 328, comprises both the sweep gas and carbon dioxide that has permeated the membranes, 325, and preferably has a carbon dioxide content of at least about 10 vol %, more preferably at least about 15 vol %, and most preferably at least about 20 vol %. Stream 328 passes, with optional addition of stream 331 and make-up air stream 332, as air intake stream 330, to first compression step, 301.

The first compression step is carried out in one or multiple compressors, and produces first compressed stream, 302, at a typical pressure of a few tens of bar, such as 20 bar or 30 bar. Stream 302 is introduced with a fuel stream, 304, into combustion step or zone, 303. Natural gas, other methane-containing gas, syngas, hydrogen, or any other fuel capable of burning in air may be used. Combustion produces hot, high-pressure gas stream 313.

In a traditional gas-fired combustion process, the exhaust gas from the combustor typically contains about 4 or 5 vol % carbon dioxide. In our process, carbon dioxide is recycled via stream 328/330, as discussed in more detail below. As a result, the concentration of carbon dioxide in stream 313 is higher than in a traditional nature gas-fired plant, and is frequently as high as at least about 10 vol %, or even at least 15 vol %, 20 vol %, or more.

A portion of the turbine exhaust stream, 329, is sent to a second compression step, 305. The second compression step is carried out in one or multiple compressors, and produces second compressed stream, 306, at a typical pressure between 2-10 bar, preferably about 5 bar, more preferably about 2 bar. Stream 306 is directed to a gas separation step, 310, where carbon dioxide is captured and removed from the process via stream 311. Depending on the operating temperature of the separation equipment, stream 306 may be cooled by heat exchange or otherwise in optional cooling step, 307, to produce cooled stream 309. Water condensed as a result of the cooling may be removed as stream 308.

Various considerations affect the choice of technology and operating methodology for step 310. In steady state, the mass of carbon dioxide removed from the process in streams 311 and 326 equals the mass of carbon dioxide generated by combustion. Preferably, at least 50%, and more preferably at least 80% or 90% of the generated carbon dioxide should be captured into stream 311.

Nevertheless, very high levels of removal of carbon dioxide from the feed inlet gas streams 306 or 309 by gas separation are not required, because the off-gas, stream 312, is not vented to the atmosphere, but is directed to sweep-based membrane separation step 324. The sweep-based membrane separation step recycles carbon dioxide in stream 330, so that the carbon dioxide concentration in stream 309 tends to be relatively high, such as 15 vol %, 20 vol % or more. Only a portion of this recirculating carbon dioxide needs to be removed into stream 311 to achieve the target high levels of carbon dioxide capture. This is a significant advantage of the process, as step 310 can then be operated using relatively low-cost, low-energy options.

Step 310 can be carried out by means of any technology or combination of technologies that can create a concentrated carbon dioxide stream from stream 306 or 309. Representative methods that may be used include, but are not limited to, physical or chemical sorption, membrane separation, compression/low temperature condensation, and adsorption. All of these are well known in the art as they relate to carbon dioxide removal from gas mixtures of various types. However, based on the considerations discussed above, the preferred technologies are absorption and membrane separation.

Step 310 produces a concentrated carbon dioxide stream, 311, which is withdrawn from the process. In addition to meeting the specified preferred capture targets, this stream has a relatively high carbon dioxide concentration, and preferably contains greater than 60 or 70 vol % carbon dioxide. Most preferably, this stream contains at least about 80 vol % carbon dioxide. Thus, unusually, the process achieves in one stream both high levels of carbon dioxide capture and high carbon dioxide concentration.

After withdrawal from the process, stream 311 may pass to any desired destination. The high concentration facilitates liquefaction, transport, pipelining, injection and other forms of sequestration.

The off-gas stream, 312, from the carbon dioxide removal or capture step still contains carbon dioxide, but at a lower concentration than the compressed gas stream, 306/309. Typically, but not necessarily, this concentration is at least about 5 vol %, and can be up to about 10 vol % or even more.

Stream 312 is sent as an air intake stream to a third compression step, 314. Optionally, it may be preferred that a portion of second compressed stream, 333, bypasses cooling step 307 and gas separation step 310, and is mixed with membrane residue stream 312 to form air intake stream 335 before entering second compression step 314. In a membrane gas separation process where carbon dioxide removal is only 40-70% of the carbon dioxide in the gas, the bypass is closed. In an amine process where carbon dioxide removal is about 90%, then the bypass is partially open and only a bit of the first compressed stream goes to the separation unit.

The third compression step is carried out in one or multiple compressors, and produces third compressed stream, 315, at a typical pressure of a few tens of bar, such as 20 bar or 30 bar.

Stream 315 is combined with combusted gas stream 313, and to produce a working gas stream, 316, that is introduced into gas turbine section, 317. This section contains one or more gas turbines, which are coupled by means of shaft, 318, to compressor(s) 301, 305, and 314 and to electricity generator, 319. The working gas drives the gas turbines, which in turn drive the generator and produce electric power.

The low-pressure exhaust gas from the turbines, stream 317, is still hot, and is optionally and preferably directed to a heat recovery steam generator, 321. This section includes a boiler that produces steam, stream 322, which can be directed to a steam turbine (not shown). Gas exiting the steam generator, stream 323, is routed as feed gas to sweep-based membrane separation step, 324. If it is necessary to cool the turbine exhaust gas before passing it to the membrane unit, this may be done by heat exchange or otherwise in a cooling step (not shown). After passing through optional HRSG, 321, an optional cooling step, or both, the turbine exhaust stream now passes as feed stream, 323, to sweep-based membrane separation step 324.

Step 324 is carried out using membranes, 325, that are selective in favor of carbon dioxide over oxygen and nitrogen. It is preferred that the membranes provide a carbon dioxide/nitrogen selectivity of at least about 10, and most preferably at least about 20 under the operating conditions of the process. A carbon dioxide/oxygen selectivity of at least 10 or 20 is also preferred. A carbon dioxide permeance of at least about 300 gpu, more preferably at least about 500 gpu and most preferably at least about 1,000 gpu is desirable. The permeance does not affect the separation performance, but the higher the permeance, the less membrane area will be required to perform the same separation.

Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50 or above. A representative preferred material for the selective layer is Pebax®, a polyamide-polyether block copolymer material described in detail in U.S. Pat. No. 4,963,165.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules and potted hollow-fiber modules. The making of all these types of membranes and modules is well known in the art. We prefer to use flat-sheet membranes in spiral-wound modules.

Step 324 may be carried out in a single bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Stream 323 flows across the feed side of the membranes, and sweep gas stream, 327, of air, oxygen-enriched air or oxygen flows across the permeate side. The gas flow pattern within the membrane modules should preferably, although not necessarily, be such that flow on the permeate side is at least partly or substantially countercurrent to flow on the feed side.

In membrane gas separation processes, the driving force for transmembrane permeation is supplied by lowering the partial pressure of the desired permeant on the permeate side to a level below its partial pressure on the feed side. The use of the sweep gas stream 327 maintains a low carbon dioxide partial pressure on the permeate side, thereby providing driving force.

The partial pressure of carbon dioxide on the permeate side may be controlled by adjusting the flow rate of the sweep stream. High sweep flow rates will achieve maximum carbon dioxide removal from the membrane feed gas, but a comparatively carbon dioxide dilute permeate stream (that is, comparatively low carbon dioxide enrichment in the sweep gas exiting the modules). Low sweep flow rates will achieve high concentrations of carbon dioxide in the permeate, but relatively low levels of carbon dioxide removal from the feed.

Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. If the pressures are about the same, the entire driving force is provided by the sweep mode operation. Optionally, stream 323 may be supplied to the membrane unit at slightly elevated pressure, by which we mean at a pressure of a few bar, such as 2 bar, 3 bar or 5 bar. If this requires recompression of stream 323, a portion of the energy used for the compressors may be recovered by expanding the residue stream, 326, in a turbine.

The membrane separation step divides stream 323 into residue stream, 326, depleted in carbon dioxide, and permeate/sweep stream, 328. The residue stream forms the treated flue gas produced by the process, and is usually discharged to the environment via the power plant stack. The carbon dioxide content of this stream is preferably less than about 5 vol %; more preferably less than about 2 vol %, and most preferably no greater than about 1 vol %.

The permeate/sweep stream, 328, preferably containing at least 10 vol % carbon dioxide, and more preferably at least about 15 vol % carbon dioxide, is withdrawn from the membrane unit and is passed to the compression unit to form at least part of the air, oxygen-enriched air or oxygen feed.

Turbine exhaust stream 320/323 is split into a second portion, stream 329, which bypasses the sweep-based membrane separation and is sent to the second compression unit, 305.

Optionally, turbine exhaust stream 320/323 may be split into a third portion, indicated by dashed line 331, which may bypass the sweep-based membrane separation and be sent with stream 328 to the first compression unit 301 as at least part of the air, oxygen-enriched air or oxygen feed.

The invention is now illustrated in further detail by specific examples. These examples are intended to further clarify the invention, and are not intended to limit the scope in any way.

EXAMPLES

All calculations were performed with a modeling program, ChemCad 6.3 (ChemStations, Inc., Houston, Tex.), containing code for the membrane operation developed by MTR's engineering group, For the calculations, all compressors and vacuum pumps were assumed to be 85% efficient. In each case, the calculation was normalized to a combustion process producing 1 ton/hour of carbon dioxide.

It was further assumed that a membrane separation unit was used as the carbon capture unit.

Example 1: Molten Salt Membranes Used for Gas Separation Step, Two Compressor Loops (not in Accordance with the Invention)

Figure 4:
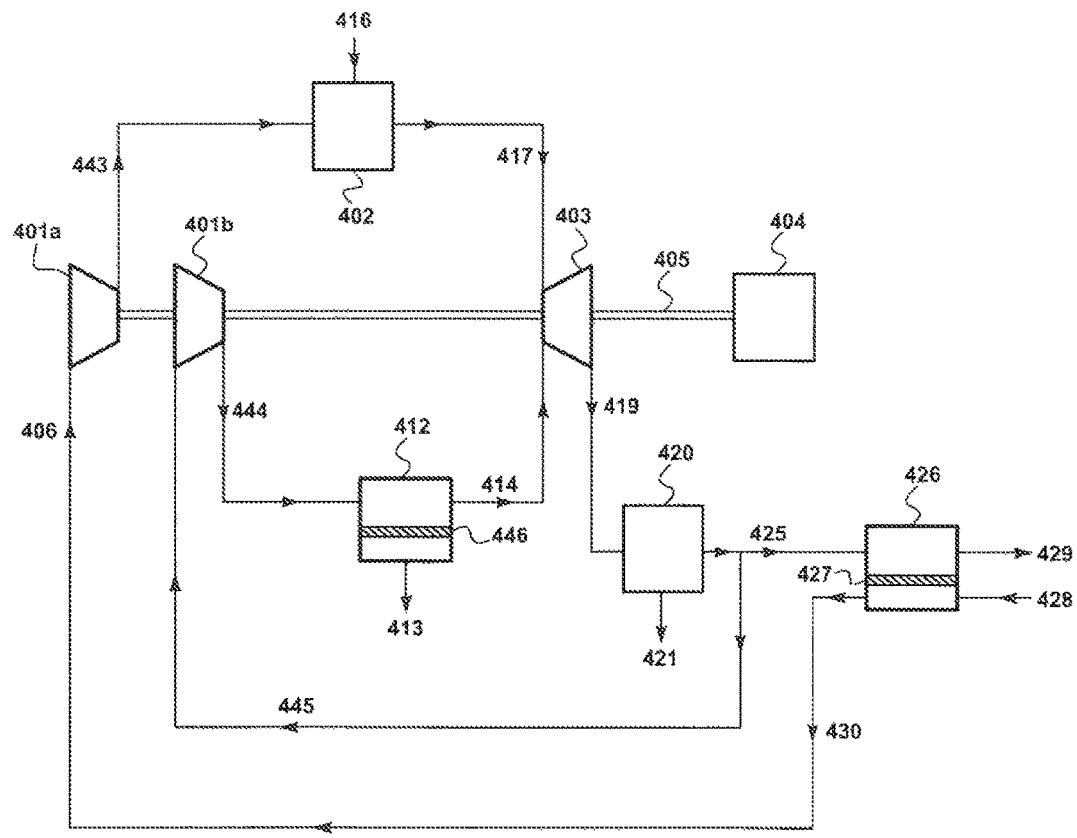
FIG. 4 is a schematic drawing of a flow scheme showing a process using two compressors (not in accordance with the invention).

As a comparative example, a computer calculation was performed to model the performance of the process with the design shown in FIG. 4. Each compressor was assumed to deliver a compressed gas at 30 bara. The ratio of turbine exhaust gas directed to the sweep unit to gas directed to compression step 401b was set at 3:1. Molten salt membranes were assumed to be used for step 412. The permeate side of the membranes was assumed to be at 2 bara.

The results of the calculation are shown in Table 1.

TABLE 1

| Stream | 416 | 428 | 406 | 445 | 444 | 419 | 425 | 413 | 429 |
|---|---|---|---|---|---|---|---|---|---|
| Molar flow (kmol/h) | 22 | 302 | 401 | 119 | 123 | 521 | 357 | 25 | 259 |
| Temp (° C.) | 38 | 15 | 25 | 25 | 375 | 634 | 25 | 374 | 11 |
| Pressure (bara) | 30 | 1 | 1 | 2 | 30 | 1 | 2 | 2 | 1 |
| Component (vol %) | | | | | | | | | |
| Oxygen | 0 | 20.7 | 15 | 4.5 | 4.5 | 4.2 | 4.5 | 1.1 | 7.2 |
| Nitrogen | 1.6 | 77.3 | 62.1 | 69.6 | 68.8 | 63.6 | 70.0 | 8.6 | 90.3 |
| Carbon dioxide | 1.0 | 0 | 20.4 | 23.5 | 24.3 | 21.4 | 23.5 | 90.3 | 0.8 |
| Methane | 93.1 | 0 | 0 | 0 | 0 | 0 | 0 | 0 | 0 |
| Water | 0 | 1.0 | 1.8 | 1.5 | 1.5 | 10.0 | 1.5 | 0 | 0.5 |
| Argon | 0 | 1.0 | 0.7 | 0.8 | 0.8 | 0.8 | 0.8 | 0 | 1.1 |
| Ethane | 3.2 | 0 | 0 | 0 | 0 | 0 | 0 | 0 | 0 |
| Prop | 0.7 | 0 | 0 | 0 | 0 | 0 | 0 | 0 | 0 |
| n-butane | 0.4 | 0 | 0 | 0 | 0 | 0 | 0 | 0 | 0 |

The process produces a stack gas containing 0.8 vol % carbon dioxide, and a concentrated product stream containing about 90 vol % carbon dioxide. The process requires a membrane area of about 74 m² for the molten salt membranes, which removes 82% of the carbon dioxide in gas stream 444, and a membrane area of about 1,430 m² for the sweep-based unit.

Example 2: Embodiment of FIG. 1, Feed Gas Pressure at 5 Bar for the Gas Separation Step A calculation was performed to model the performance of the process of the invention shown in FIG. 1 where the feed gas to the gas separation step, 106, is compressed to a pressure of 5 bar by compression step 101.

For the calculation, the feed gas stream 104 was calculated to have a flow rate of 16,557 kg/hour and contain nitrogen, oxygen, carbon dioxide and water. It was also calculated that the molar compositions were approximately as follows:

Nitrogen: 74.4%

Oxygen 14.4%

Carbon dioxide: 10.4%

Water: 0.8%

It was assumed that a portion of the exhaust gas 119 was used as an internal recycle as stream 120.

The results of the calculations are shown in Table 2.

TABLE 2

| Stream | 104 | 107 | 108 | 111 | 119 | 120 | 129 | 130 | 135 |
|---|---|---|---|---|---|---|---|---|---|
| Total Mass Flow (kg/h) | 16,557 | 1,018 | 15,539 | 371 | 15,527 | 3,494 | 9,642 | 11,050 | 15,539 |
| Temp (° C.) | 30 | 30 | 30 | 30 | 35 | 35 | 30 | 30 | 30 |
| Pressure (bara) | 5.0 | 0.2 | 5.0 | 30.0 | 1.1 | 1.1 | 1.1 | 0.9 | 1.0 |
| Component (mol %) | | | | | | | | | |
| Nitrogen | 74.4 | 17.0 | 77.3 | 0.5 | 77.1 | 7.1 | 88.6 | 79.0 | 71.6 |
| Oxygen | 14.4 | 6.5 | 14.8 | 0.0 | 6.0 | 6.0 | 9.8 | 21.0 | 13.8 |
| Carbon Dioxide | 10.4 | 68.8 | 7.4 | 0.1 | 11.8 | 11.8 | 1.3 | 0.0 | 10.0 |
| Water | 0.8 | 7.7 | 0.5 | 0.0 | 5.1 | 5.1 | 0.3 | 0.0 | 4.6 |
| Methane | 0.0 | 0.0 | 0.0 | 98.2 | 0.0 | 0.0 | 0.0 | 0.0 | 0.0 |
| $C_{2+}$ Hydrocarbons | 0.0 | 0.0 | 0.0 | 1.2 | 0.0 | 0.0 | 0.0 | 0.0 | 0.0 |

The process produces a stack gas containing 1.3% carbon dioxide, and a concentrated product stream containing about 69% carbon dioxide. The process achieves a carbon dioxide recovery of 80%. The membrane area used for step 106 was 198 m² and the membrane area required for step 127 was 10,000 m².

Example 3: Embodiment of FIG. 1, Feed Gas Pressure at 2 Bar for the Gas Separation Step A calculation was performed to model the performance of the process of the invention shown in FIG. 1 where the feed gas to the gas separation step, 106, is compressed to a pressure of 2 bar by compression step 101.

For the calculation, the feed gas stream 104 was calculated to have a flow rate of 16,354 kg/hour and contain nitrogen, oxygen, carbon dioxide and water. It was also calculated that the molar compositions were approximately as follows:
Nitrogen: 70.9%
Oxygen 14.8%
Carbon dioxide: 12.2%
Water: 2.1%

It was assumed that a portion of the exhaust gas 119 was used as an internal recycle as stream 120.

The results of the calculations are shown in Table 3.

TABLE 3

| Stream | 104 | 107 | 108 | 111 | 119 | 120 | 129 | 130 | 135 |
|---|---|---|---|---|---|---|---|---|---|
| Total Mass Flow (kg/h) | 16,354 | 811 | 15,543 | 372 | 15,414 | 3,237 | 9,560 | 10,742 | 16,593 |
| Temp (° C.) | 30 | 30 | 30 | 30 | 35 | 35 | 30 | 30 | 43 |
| Pressure (bara) | 2.0 | 0.2 | 2.0 | 1.0 | 1.1 | 1.0 | 1.1 | 0.9 | 1.0 |
| Component (mol %) | | | | | | | | | |
| Nitrogen | 70.9 | 17.6 | 73.1 | 0.5 | 73.9 | 73.9 | 87.4 | 79.0 | 69.2 |
| Oxygen | 14.8 | 7.1 | 15.1 | 0.0 | 6.3 | 6.3 | 9.3 | 21.0 | 14.4 |
| Carbon Dioxide | 12.2 | 62.0 | 10.2 | 0.1 | 14.7 | 14.7 | 2.8 | 0.0 | 12.0 |
| Water | 2.1 | 13.3 | 1.6 | 0.0 | 5.1 | 5.1 | 0.5 | 0.0 | 4.4 |
| Methane | 0.0 | 0.0 | 0.0 | 98.2 | 0.0 | 0.0 | 0.0 | 0.0 | 0.0 |
| $C_{2+}$ Hydrocarbons | 0.0 | 0.0 | 0.0 | 1.2 | 0.0 | 0.0 | 0.0 | 0.0 | 0.0 |

The process produces a stack gas containing about 3% carbon dioxide, and a concentrated product stream containing about 62% carbon dioxide. The process achieves a carbon dioxide recovery of 60%. The membrane area used for step 106 was 456 m² and the membrane area required for step 127 was 6,000 m².

Example 4: Embodiment of FIG. 3, Three Compressor Loops

A calculation was performed to model the performance of the process of the invention using three compressors in accordance with the design shown in FIG. 3. The feed gas to the gas separation step, 310, was compressed to a pressure of 2 bar by compression step 305.

For the calculation, the feed gas stream 309 was calculated to have a flow rate of 16,354 kg/hour and contain nitrogen, oxygen, carbon dioxide and water. It was also calculated that the molar compositions were approximately as follows:
Nitrogen: 70.9%
Oxygen 14.8%
Carbon dioxide: 12.2%
Water: 2.1%

It was assumed that a portion of the exhaust gas 323 was used as an internal recycle as stream, 331.

The results of the calculations are shown in Table 4.

TABLE 4

| Stream | 309 | 311 | 312 | 320 | 329 | 331 | 326 | 327 | 330 |
|---|---|---|---|---|---|---|---|---|---|
| Total Mass Flow (kg/h) | 6,920 | 744 | 6,176 | 15,175 | 6,980 | 819 | 5,978 | 7,111 | 6,980 |
| Temp (° C.) | 30 | 30 | 30 | 33 | 33 | 35 | 30 | 30 | 32 |
| Pressure (bara) | 2.0 | 0.2 | 2.0 | 1.1 | 1.1 | 1.1 | 1.1 | 0.9 | 1.0 |
| Component (mol %) | | | | | | | | | |
| Nitrogen | 80.9 | 18.4 | 86.7 | 79.7 | 79.7 | 79.7 | 92.1 | 79.0 | 79.7 |
| Oxygen | 1.1 | 0.5 | 1.2 | 1.1 | 1.1 | 1.1 | 2.9 | 21.0 | 1.1 |

TABLE 4-continued

| | | | | | | | | | |
|---|---|---|---|---|---|---|---|---|---|
| Carbon Dioxide | 15.9 | 69.8 | 10.9 | 15.7 | 15.7 | 15.7 | 4.5 | 0.0 | 15.7 |
| Water | 2.1 | 11.3 | 1.2 | 3.5 | 3.5 | 3.5 | 0.5 | 0.0 | 3.5 |

The process produces a stack gas containing about 4.5% carbon dioxide, and a concentrated product stream containing about 70% carbon dioxide. The process also achieves a carbon dioxide recovery of 60%. The membrane area used for step 310 was 360 m² and the membrane area required for step 324 was 2,000 m².

We claim:

1. A process for controlling carbon dioxide exhaust from a combustion process, comprising:
   (a) compressing an oxygen-containing stream in a first compression apparatus, thereby producing a first compressed gas stream;
   (b) compressing a carbon dioxide-containing stream in a second compression apparatus, thereby producing a second compressed gas stream;
   (c) combusting the first compressed gas stream with a gaseous fuel in a combustion apparatus, thereby producing a combusted gas stream;
   (d) routing at least a portion of the second compressed gas stream to a gas separation apparatus adapted to selectively remove carbon dioxide, thereby producing a carbon dioxide-enriched stream and a carbon dioxide-depleted stream;
   (e) compressing the carbon dioxide-depleted stream in a third compression apparatus, thereby producing a third compressed gas stream;
   (f) routing the combusted gas stream and the third compressed gas stream as part of a working gas stream to a gas turbine apparatus mechanically coupled to an electricity generator, and operating the gas turbine apparatus, thereby generating electric power and producing a turbine exhaust stream;
   (g) passing a first portion of the turbine exhaust stream back to the second compression apparatus as at least a portion of the carbon dioxide-containing stream;
   (h) passing at least a second portion of the turbine exhaust stream to a membrane separation step, wherein the membrane separation step comprises:
      (i) providing a membrane having a feed side and a permeate side, and being selectively permeable to carbon dioxide over nitrogen and to carbon dioxide over oxygen,
      (ii) passing a third portion of the turbine exhaust stream across the feed side,
      (iii) passing air, oxygen-enriched air, or oxygen as a sweep stream across the permeate side,
      (iv) withdrawing from the feed side a residue stream that is depleted in carbon dioxide compared to the turbine exhaust stream, and
      (v) withdrawing from the permeate side a permeate stream comprising oxygen and carbon dioxide; and
      (vi) passing the permeate stream to step (a) as at least a portion of the oxygen-containing stream.

2. The process of claim 1, wherein the gas separation apparatus is selected from the group consisting of absorption, adsorption, liquefaction, and membrane separation.

3. The process of claim 2, wherein the gas separation apparatus is membrane separation.

4. The process of claim 3, wherein the membrane separation apparatus incorporates polymeric membranes.

5. The process of claim 1, further comprising the step of passing the third portion of the turbine exhaust stream to step (a) as at least a part of the oxygen-containing gas before carrying out step (g).

6. The process of claims 1 or 5, further comprising the step of routing the turbine exhaust stream in (f) to a heat recovery steam generator before carrying out step (g).

7. The process of claim 1, further comprising the step of cooling the turbine exhaust stream (f) before carrying out step (g).

8. The process of claim 1, wherein the residue stream has a carbon dioxide concentration of less than 5 vol %.

9. The process of claim 1, wherein the second compressed gas stream is withdrawn from the second compression apparatus at a pressure within the range of about 2 bar to about 10 bar.

10. The process of claim 1, wherein the first compressed gas stream is withdrawn from the first compression apparatus at about 30 bar.

11. The process of claim 1, further comprising cooling the second compressed gas stream to a temperature of about 30-100° C. prior to step (d).

12. The process of claim 1, wherein the gaseous fuel comprises natural gas.

13. The process of claim 1, wherein a second portion of the second compressed stream is mixed with the carbon dioxide-depleted stream from step (d) prior to step (e).

* * * * *